US008213515B2

(12) United States Patent
Kudana et al.

(10) Patent No.: US 8,213,515 B2
(45) Date of Patent: Jul. 3, 2012

(54) INTERPOLATED SKIP MODE DECISION IN VIDEO COMPRESSION

(75) Inventors: Arun Shankar Kudana, Bangalore (IN); Soyeb N. Nagori, Bangalore (IN); Ajit Venkat Rao, Bangalore (IN); Manoj Koul, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 835 days.

(21) Appl. No.: 12/352,172

(22) Filed: Jan. 12, 2009

(65) Prior Publication Data

US 2009/0180539 A1 Jul. 16, 2009

Related U.S. Application Data

(60) Provisional application No. 61/020,440, filed on Jan. 11, 2008, provisional application No. 61/021,711, filed on Jan. 17, 2008.

(51) Int. Cl.
*H04N 7/12* (2006.01)

(52) U.S. Cl. ................................. 375/240.17

(58) Field of Classification Search ............. 375/240.01, 375/240.15–240.17, 240.26; *H04N 7/12*
See application file for complete search history.

(56) References Cited

U.S. PATENT DOCUMENTS 6,968,008 B1 * 11/2005 Ribas-Corbera et al. ................. 375/240.17
2006/0280252 A1 * 12/2006 Kwon et al. ............. 375/240.16

* cited by examiner

*Primary Examiner* — Young Lee
(74) *Attorney, Agent, or Firm* — Robert D. Marshall, Jr.; Wade James Brady, III; Frederick J. Telecky, Jr.

(57) ABSTRACT

A video encoding method determines the best video encoding mode for a macroblock in the SKIP mode and comparing this cost with other modes. This avoids sub-pixel interpolations for fractional pixels. This models the cost function in a quadratic model and computes the cost for a nearest integer pel and plural adjacent integer pels. This permits determination of the coefficients of the quadratic model. An estimated cost is obtained using the actual fractional pel position in the quadratic model. This can be used for obtaining the cost of a P Skip mode. This can be used for the decision of B direct or B skip modes in B frames.

5 Claims, 6 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

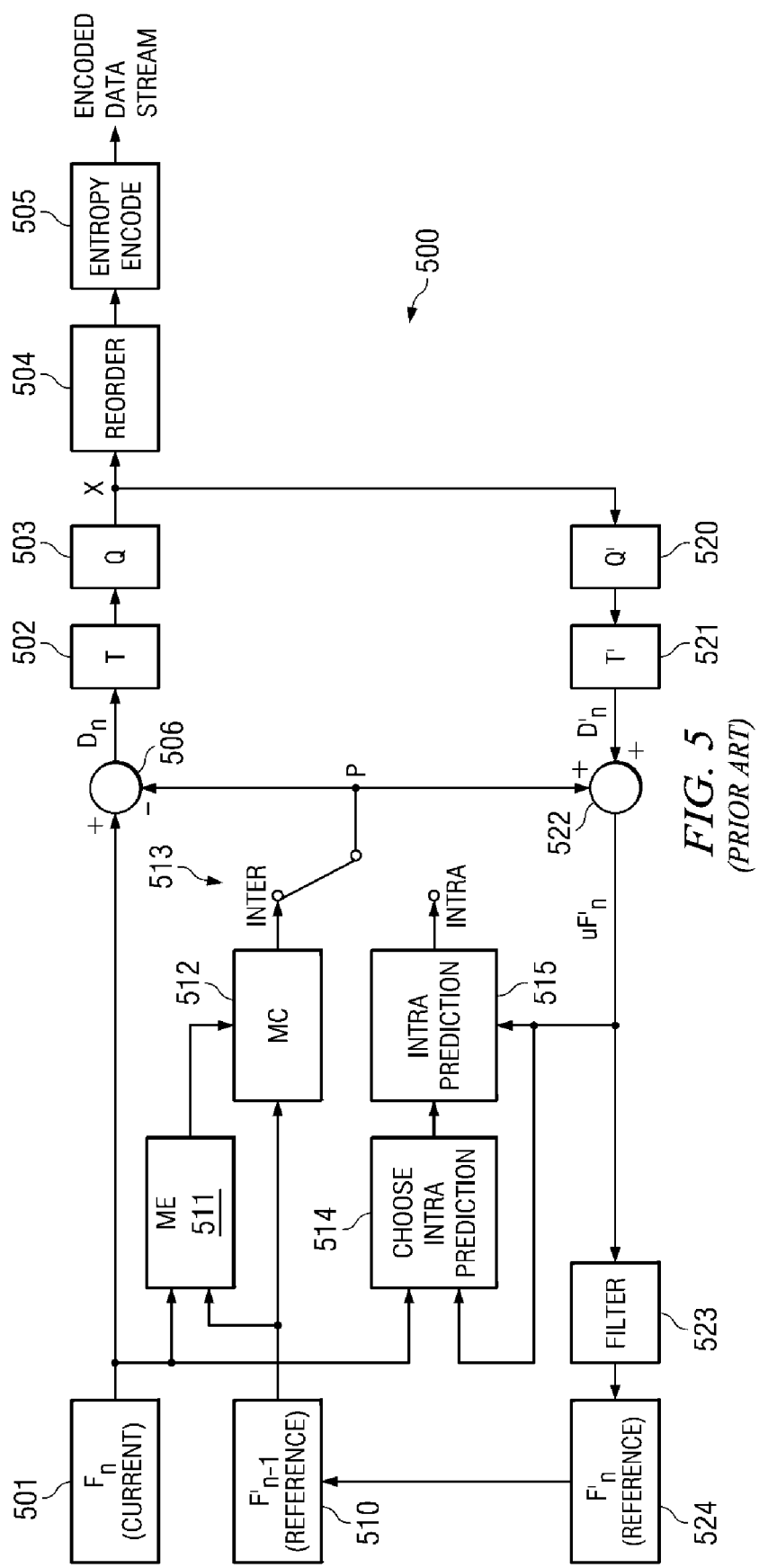

INTERPOLATED SKIP MODE DECISION IN VIDEO COMPRESSION

CLAIM OF PRIORITY

This application claims priority under 35 U.S.C. 119(e)(1) to U.S. Provisional Application No. 61/020,440 filed Jan. 11, 2008 and U.S. Provisional Application No. 61/021,711 filed Jan. 17, 2008.

TECHNICAL FIELD OF THE INVENTION

The technical field of this invention is video compression.

BACKGROUND OF THE INVENTION

Skip mode coding is one of the important tools in advanced video coding standards. The accuracy of skip mode coding impacts the rate distortion performance and thus the video quality of an encoder. Most video encoders determine the best encoding mode for a particular macroblock. This requires evaluating the cost of encoding the macroblock in the SKIP mode by computing a true prediction error of a SKIPPED motion vector and comparing this cost with the cost of other intra/inter modes. The video encoder then chooses the minimal cost mode. Computation of this SKIP cost involves generating a predicted macroblock using the actual SKIP motion vector as the True motion vector (MV) including a set of standard defined sub-pixel interpolations generating the predicted macroblock based on a fractional pel accurate SKIP motion vector. Recent advances in fast integer pel search using predictor based fast search patterns the fractional pel search have become as computationally expensive as integer pel search. Thus additional fractional pel prediction computations add significant complexity to the encoding.

Another commonly used method employs a nearest integer approximation of SKIP motion vector. This avoids pixel interpolation and evaluates the prediction error at the full pel SKIP motion vector position for use in mode decision. This results in a suboptimal SKIP mode decision and affects the rate distortion performance and video quality of the video encoder.

One other problem faced in video compression is the amount of data transferred between the core CPU and the memory system storing video data being which includes compressed and reference video frames. Common systems do the mode decisions by operating on subsampled frames which are formed by a subset of pixels that are picked up from the normal frame to reduce the amount of these transfers. Prediction errors are computed based on only the pixels available in the subsampled space. Using these prediction errors in mode decisions results in more suboptimality in the model decision.

SUMMARY OF THE INVENTION

This invention addresses the complexity and suboptimality using a method that has better rate distortion performance than the suboptimal mode decision at full pixel approximation and reduced complexity and high computational efficiency than the first method which uses the true prediction error.

This invention enables determination of the best video encoding mode for a macroblock in the SKIP mode and comparing this cost with other modes. This invention avoids sub-pixel interpolations on a fractional pixel. This invention models the cost function in a quadratic model and computes the cost for a nearest integer pel and plural adjacent integer pels. This permits determination of the coefficients of the quadratic model. An estimated cost is obtained using the actual fractional pel position in the quadratic model. This method can be used for the decision of B direct or B skip modes in B frames.

BRIEF DESCRIPTION OF THE DRAWINGS

These and other aspects of this invention are illustrated in the drawings, in which:

FIG. 4 illustrates the instruction syntax of the very long instruction word digital signal processor core illustrated in FIG. 2 (prior art);

FIG. 5 illustrates an overview of the video encoding process of the prior art;

DETAILED DESCRIPTION OF PREFERRED EMBODIMENTS

Figure 1:
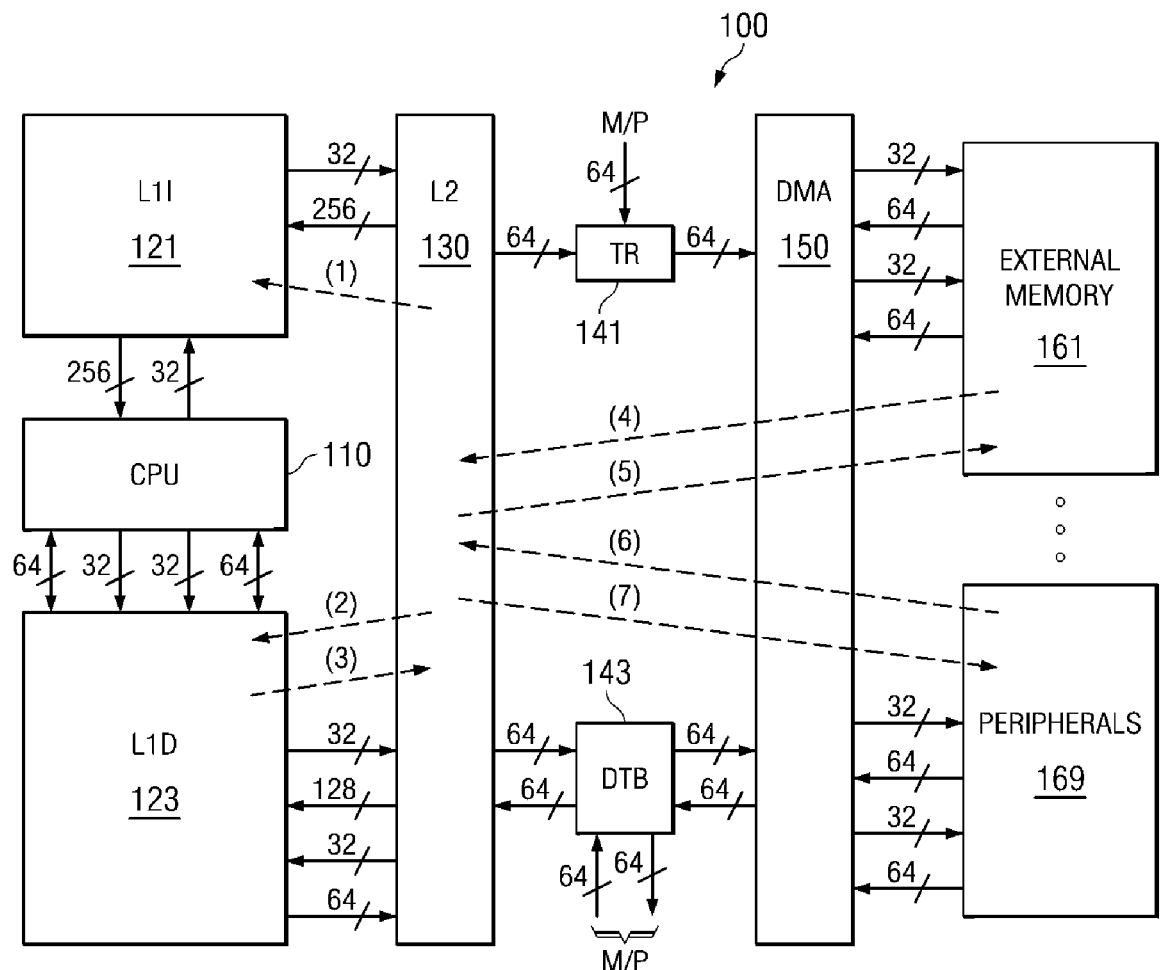
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
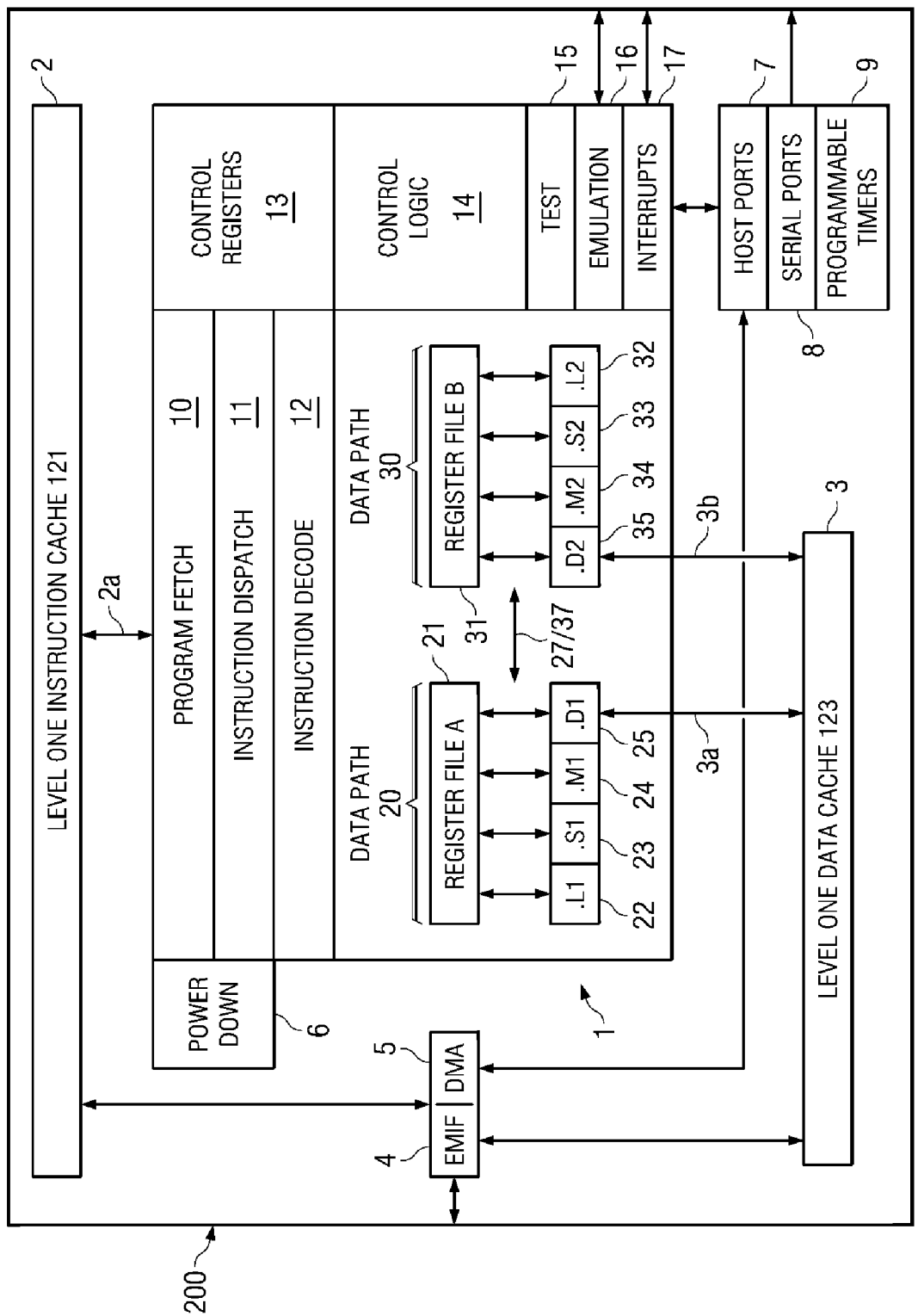
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3*a* and 3*b*. Each internal port 3*a* and 3*b* preferably has 32 bits of data and a 32-bit byte address reach. Level one instruction cache 121 may be internally accessed by central processing unit 1 via a single port 2*a*. Port 2*a* of level one instruction cache 121 preferably has an instruction fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
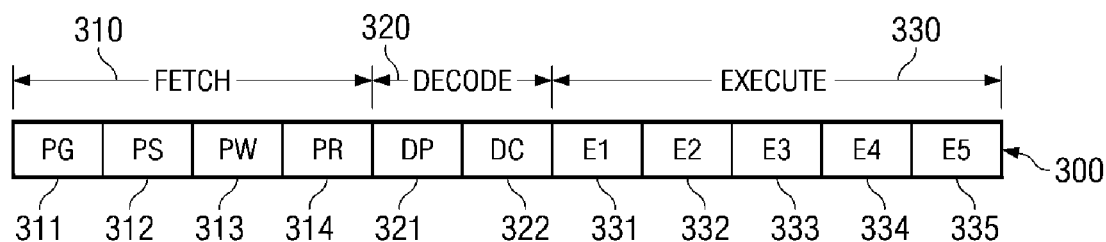
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 323 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the encoding process 500 of video encoding according to the prior art. Many video encoding standards use similar processes such as represented in FIG. 5. Encoding process 500 begins with the n th (current) frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream. This invention concerns content adaptive binary arithmetic coding (CABAC) which will be further described below.

This invention estimates the prediction error at any pixel whose value is not available due a subsampling by interpolation of the known prediction errors. This technique is also used to estimate the errors at the fractional pixel positions to simplify the SKIP mode decision.

This invention interpolates the prediction errors that correspond to N neighboring integer pel motion vector positions around the actual SKIP motion vector and estimates the prediction error at the actual SKIP Motion vector position. This can be quarter pel resolution. N is preferably 5.

The prediction errors at the integer pel SKIP motion vector position nearest the fractional pel SKIP motion vector and N−1 full pel positions around it are evaluated. This invention models the two dimensional surface of the error function as a paraboloid. The parameters of this paraboloid are computed as a function of these N error values. These computations involve only simple shifts and additions. Thus their complexity is negligible. The prediction error at any sub-pel position on this surface is estimated by modeling it as an equation of the paraboloid or 3-D polynomial. This estimated error at the fractional pel accurate SKIP motion vector is then used in the mode decision.

This invention estimates the error at the accurate SKIP motion vector position using a 3-D polynomial/paraboloid method. This does not involve the complexity of calculating the true prediction error. Thus this invention is computationally much simpler and delivers an equivalent performance as using the true prediction method. Thus this invention has an advantage over the prior method which has high computational cost and complexity.

Prior art mode decision algorithms first use actual interpolation for generation of predicted macroblock. The prediction error is then computed using this predicted macroblock. These methods have huge computational costs for video standards like H.264.

This invention has better rate distortion performance than using the prediction error at the nearest Integer pel SKIP motion vector. In many cases such as in video conferencing, this invention has performance similar to using a predicted macroblock obtained using standard defined interpolation.

The ITU H.264 Advanced Video Coding standard enables high quality compressed video. However, the high compression in H.264 standard requires significant computational complexity. The complexity results from a variety of sources such as the use of tree structured motion compensation using block sizes from 16 by 16 down to 4 by 4 and the use of a variety of intra modes for prediction of block sizes of 16 by 16, 8 by 8 and 4 by 4. The H.264 standard provides the option of many coding modes in addition to a not-coded mode called a SKIP Mode in Inter slices for each macroblock. The wide choice of coding modes and the not-coded mode makes this mode decision the most complex part of a H.264 standard encoder.

In addition to the complexity of choice of modes, motion vectors of half pixel accuracy dictate the use of a complex 6-tap filter to generate the motion compensated predicted macroblock used for variance calculation for estimating motion. Motion compensation using a motion vector of quarter pixel accuracy adds to the above mentioned complexity because it needs to use a bi-linear filter on the half pixels generated using the 6-tap filter.

The decision to code or not code (SKIP) a macroblock is done by comparing the rate distortion costs involved in coding a macroblock with the cost of a not-coded macroblock. The complexity of interpolation becomes two fold with the mode decision involving SKIP Mode because an additional set of interpolation is done to compute the SKIP Mode cost.

Several fast algorithms have been developed to speed up the fractional pixel refinement of the Inter motion vectors by converging at a minimum cost sub-pixel position around the winning integer pixel motion vector. These methods do not reduce the complexity of the SKIP mode decision. A variety of Early SKIP techniques have also been proposed but these techniques provide negligible reduction in complexity in some real time implementation on few complex embedded architecture.

The rate distortion cost of coding a macroblock is given by:

$$D_{code} + \lambda_{mode} \times R_{code} \quad (1)$$

where: $D_{code}$ is the distortion measure of coding a macroblock in one of the available Intra modes or one of the Inter coding modes; $\lambda_{mode}$ is a Lagrangian multiplier; and $R_{code}$ is the rate associated with the corresponding mode.

This cost is compared with the cost of not-coded macroblock $D_{skip}$. The cost of a not coding a macroblock is only the distortion measure $D_{skip}$ and has no rate term in it since only a bit or a few bits for few successive SKIP macroblocks are sent in the bit stream.

There are many popular metrics for measuring the distortion such as Sum of Absolute Differences (SAD) and Sum of Square of Errors (SSE). This application presents analysis and experimental results using SAD. The SAD metric is used extensively in embedded architectures.

The Sum of Absolute Differences (SAD) is:

$$S(p) = \Sigma |Y(p) - Y(c)| \quad (2)$$

where: p is an integer pixel or a fractional pixel in the previously reconstructed picture; c is the pixel in the current picture; and Y(x) represents the luma value of the relevant pixel. Similarly, the Sum of Square of Errors (SSE) is:

$$S(p) = \Sigma (Y(p) - Y(c))^2 \quad (3)$$

The computation of $D_{skip}$ includes the complexity of generating a predicted macroblock based on applying motion compensation to the reference frame using the Skip motion vector. The Skip motion vector is derived by median filtering a set of motion vectors of the macroblock's three spatial neighbors. The most complex part of this process is the derivation of predicted macroblock by motion compensation. A set of standard defined Interpolation filters must be applied to generate a predicted macroblock based on a motion vector of fractional pel accuracy. The H.264 standard requires 6 tap filters for the generation half pixels. Choosing the best mode for a macroblock involves two sets of interpolation. The first interpolation is for the fractional pixel refinement of the Integer Pel motion vector for the Inter coding mode and the second interpolation is for the evaluation of $D_{skip}$.

A common prior art method to avoid the complex interpolation during the SKIP mode decision uses the nearest integer approximation of SKIP Motion Vector and evaluates the prediction error at the full pixel SKIP Motion Vector position in the mode decision. This results in a suboptimal SKIP mode decision and affects the rate distortion performance and video quality of the video encoder. This invention deals with the issue of complexity and suboptimality. This invention is a method having better rate distortion performance than the suboptimal mode decision at full pixel approximation with reduced complexity and high computational efficiency than prior art methods that use the true prediction error.

Figure 6:
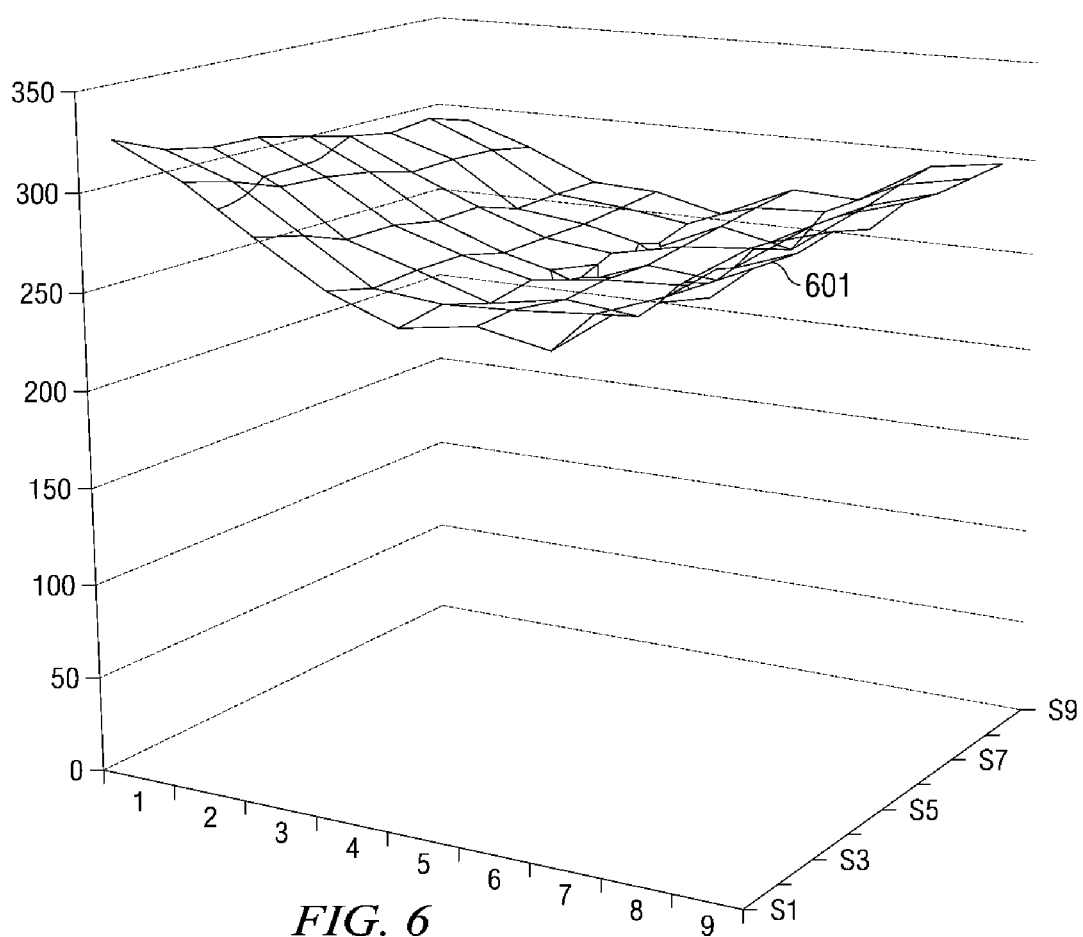
FIG. 6 illustrates an example of the quadratic distortion model of this invention.

FIG. 6 illustrates the motivation of the inventive method to eliminate the complex interpolation. FIG. 6 is a surface plot 601 of actual SADs at different sub-pixel positions of a reference frame at and around the position of the actual SKIP motion vector. Numbers 1 to 9 along one of the coordinate axis denote the pixel positions (X−1) to (X+1) in steps of 0.25 pel, where X is the x component of the SKIP motion vector rounded to the nearest Integer pixel. Reference numerals S1 to S9 along the other axis denote pixels positions (Y−1) to (Y+1) in steps of 0.25 pel, where Y is the y component of the SKIP motion vector rounded to the nearest Integer pixel.

The property of SAD necessitates the surface to be convex one. This invention models this surface of the error function as a complex polynomial of x and y, where x and y are the spatial coordinates of a pixel in the picture. This modeling is limited to polynomials of order 2 for both variables to make the real-time implementation of the proposed concept simple. This modeling uses a separable form of the polynomial with no cross terms. This makes the solution to the polynomial feasible with the knowledge of only 5 points on the surface.

This method assumes that the quadratic model is denoted by:

$$S(p) = C_1 x^2 + C_2 x + C_3 y^2 + C_4 y + C_5 \quad (4)$$

where: x and y are the spatial coordinate of the pixel in a picture; and S(p) is the measure of similarity such as SAD defined by equation (2) or SSE defined by equation (3).

Figure 7:
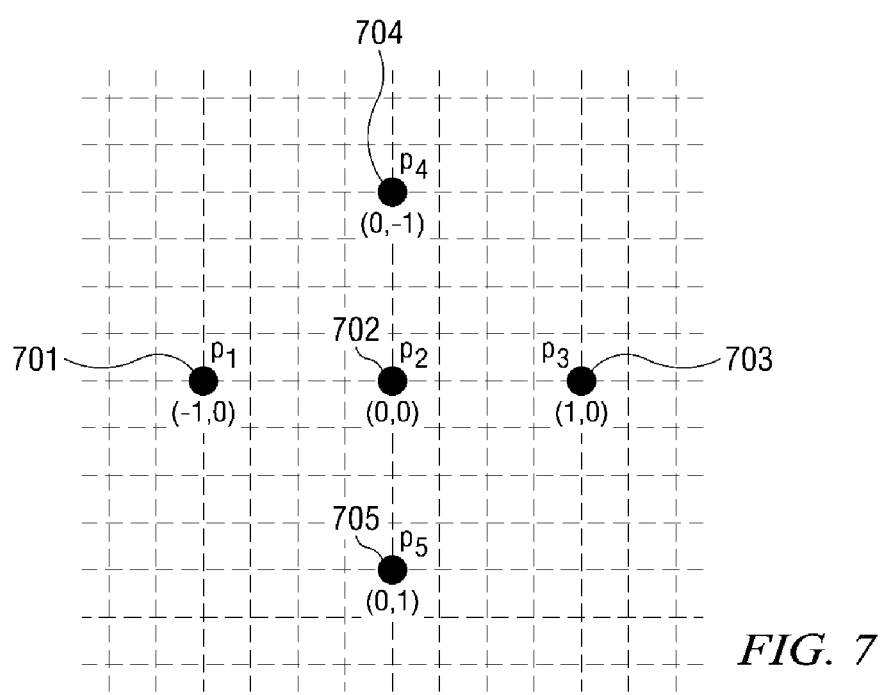
FIG. 7 illustrates the relationship between the nearest fractional pel and the adjacent neighboring pels in this invention.

Given the Cartesian coordinates of 5 pixel positions and the SADs at those 5 positions, it is possible to solve for the 5 unknowns ($C_1$, $C_2$, $C_3$, $C_4$ and $C_5$) in equation (4). This invention chooses the 5 positions to be the integer pixel nearest to the fractional pel accurate SKIP motion vector and 4 surrounding integer pixels. FIG. 7 illustrates the pixel position 702 $p_2$ (0,0) as the nearest integer pixel and pixel positions 701 $p_1$ (−1,0), 704 $p_4$ (0,−1), 703 $p_3$ (1,0) and 705 $p_5$ (0,1) as the four surrounding pixels. In FIG. 7 the distance between any two grid lines is a quarter pixel.

Equation (4) can be solved as follows:

$$C_1 = S(p_1) - 2S(p_2) - \frac{S(p_3)}{2}$$
$$C_2 = \frac{S(p_3) - S(p_1)}{2}$$
$$C_3 = S(p_4) - 2S(p_2) - \frac{S(p_5)}{2}$$
$$C_4 = \frac{S(p_5) - S(p_4)}{2}$$
$$C_5 = S(p_2)$$

(5)

The model parameters in equation (5) can be used with equation (4) to estimate the SAD at the quarter pel accuracy SKIP motion vector position. This estimated SAD value is used instead of the actually calculated value according to equation (2) and the H.264 standard 6-tap filter.

This simplifies the complexity of the SKIP mode decision by avoiding a complex set of interpolations for generating the predicted macroblock. Equation (5) includes easily implemented subtraction and shift operations where the multiplication and division by 2 are implemented as shifts. Though this approach involves the computation of 4 additional SADs, for most applications the complexity of the SAD computations is much less than the complexity the predicted macroblock computation using a set of interpolation filters.

Figure 8:
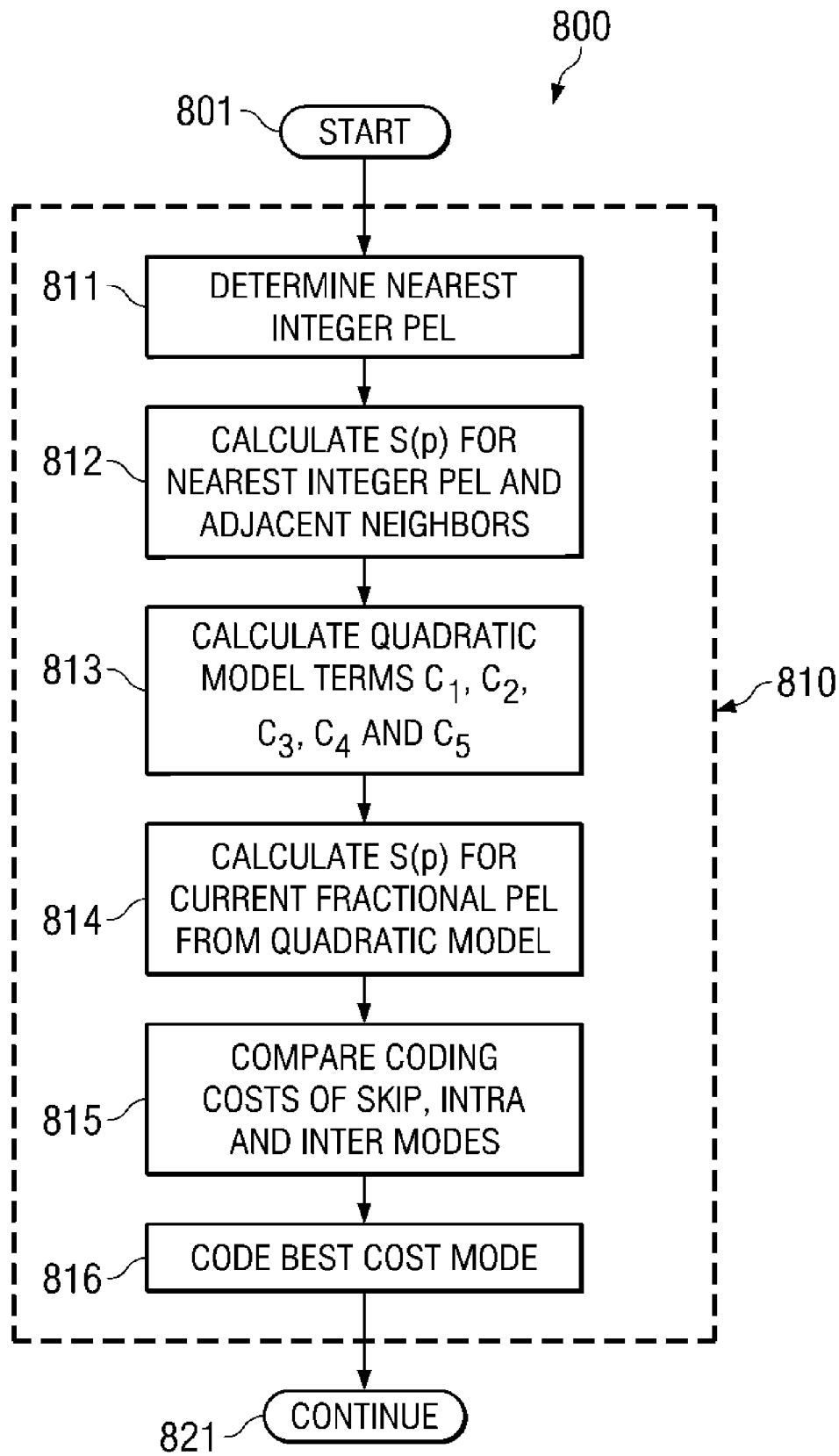
FIG. 8 illustrates a flow chart of the macroblock coding mode decision according to this invention which is a part of video coding.

FIG. 8 illustrates a flow chart of the part 810 of the video encoding process relevant to this invention. The flow chart begins with start step 801. Part 810 first determines the nearest integer pel in step 811. Step 812 calculates the similarity measure S(p) for this nearest integer pel and adjacent neighbor integer pels. These calculations are made according to equation (2) for SAD or other suitable calculation for SSE or other similarity measures. Step 813 calculates the quadratic model terms $C_1$, $C_2$, $C_3$, $C_4$ and $C_5$ according to equations (5). Step 814 calculates an estimate of the similarity measure S(p) from the quadratic model according to equation (4). Step 815 compares the coding costs of the various modes including skip mode, intra prediction mode and inter predication mode. Step 816 selects and codes the mode yielding the best cost estimate. The mode selection is then complete for that macroblock. Processing continues in step 821. This may include mode selection for another macroblock or other video encoding tasks.

Macroblocks of a B frame use information from a preceding frame and a future frame. Such a bidirectional prediction macroblock can have two motion vectors, one for each adjacent frame. The preferred embodiment computes two prediction macroblocks from these two motion vectors. These two prediction macroblocks are then averaged to form the final prediction. This predicted macroblock is used is the computation of SAD during mode decision. Such B frames have a special coding mode for macroblocks called the B direct mode in addition to the B skip mode. B direct mode and B skip mode have the same logic for the derivation of the predictor motion vector but B direct macroblocks have residual put in the bit stream unlike B skip which has neither residual nor motion vector residual.

The direct or skip mode decision in a B frame is much more complex than a the skip mode decision in P frames because the direct motion vector could be a bidirectional prediction motion vector necessitating the two sets of sub-pixel interpolations in two separate windows, one for the forward direction and one for the backward direction. When the direct motion vector of a macroblock of a B frame is bidirectional predictive having 2 motion vectors, this invention uses a similar approach of evaluation of 5 bidirectional prediction SADs at 5 positions around the integer pixel motion vectors. However the relative positions of the two quarter pixel motion vectors might not be the same with reference to the (0,0) nearest pel position on each of the directions. Using the SAD obtained by interpolation described for p at the midway between these two offsets with reference to the (0,0) while doing the mode decision is a good simplification of the problem without sacrificing much video quality.

Assume evaluation of 5 bidirectional prediction similarity measures at 5 positions around the integer pixel motion vectors of each direction. The sub-pel positions in the vicinity of these 5 positions can be modeled by same quadratic polynomial.

Figure 9A:
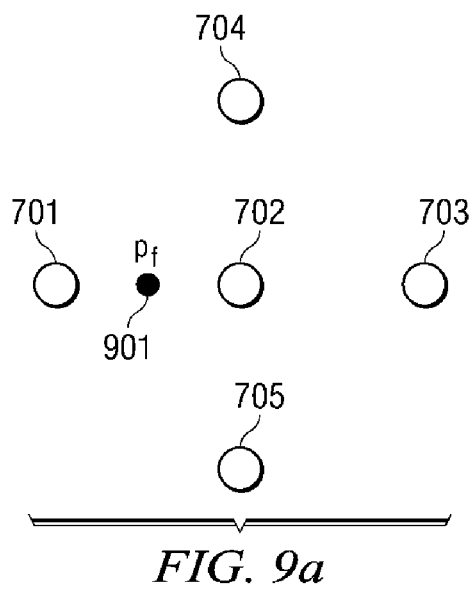
FIG. 9 illustrates pel positions used in bidirectional prediction with FIG. 9(a) illustrating the position of a forward reference window sub-pixel $p_f$, FIG. 9(b) illustrating the position of a backward reference window sub-pixel $p_b$, and FIG. 9(c) illustrating the position of the point $p_{bi}$ mid-way between $p_f$ and $p_b$ used in the estimation of the bidirectional prediction similarity measure.
Figure 9B:
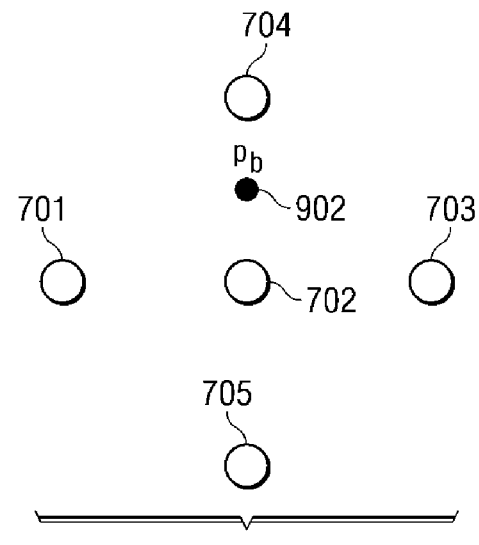
Figure 9C:
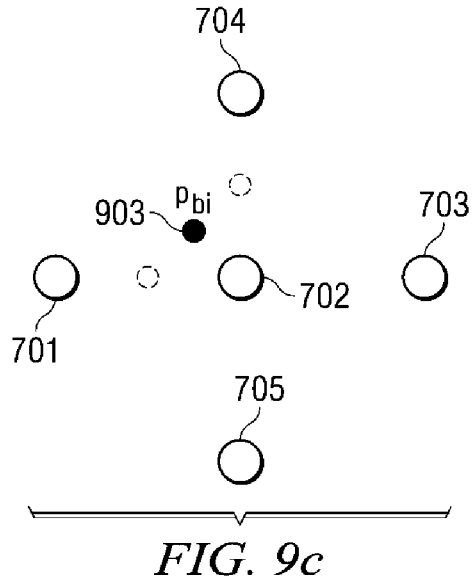

The positions of the two quarter pel motions vectors with reference to the (0,0) nearest integer position in the two directions might not be the same. FIG. 9 illustrates an example of such a case. In FIG. 9 reference numbers 701, 702, 703, 704 and 705 refer to respective integer pixel positions $p_1$, $p_2$, $p_3$, $p_4$ and $p_5$ illustrated in FIG. 7. FIG. 9(a) illustrates the location of the forward prediction position 901 $p_f$. FIG. 9(b) illustrates the location of the backward prediction position 902 $p_b$. FIG. 9(c) illustrates the position 903 $p_{bi}$ at the point mid-way between the two actual sub-pel positions 901 $p_f$ and 902 $p_b$. Using this position 903 $p_{bi}$ is a good simplification of the bidirectional prediction problem without sacrificing on the video quality much.

This invention has better rate distortion performance than the case where the prediction error at the nearest Integer pel SKIP motion vector was used in the mode decision. In most cases at low bit rates this invention has a similar rate distortion performance as that of the SKIP and direct mode decisions involving the Standard defined interpolation for the generating of predicted macroblock.

Using this invention to estimate the error at the accurate SKIP motion vector position using a 3-D polynomial/paraboloid method does not involve the complexity of calculating the true prediction error. Thus this invention is computationally much simple and delivers an equivalent performance of the true prediction method which has a disadvantage arising from high computational cost and complexity.

What is claimed is:

1. A method of video coding comprising:
    determining a measure of similarity between a prior frame and a current frame offset for a current macroblock by a motion vector having a fractional pel including
        determining a nearest integer pel of said fractional pel,
        calculating said measure of similarity for said nearest integer pel,
        determining four integer pels adjacent to said nearest integer pel including a first adjacent integer pel immediately left of said nearest integer pel, a second adjacent integer pel immediately right of said nearest integer pel, a third adjacent integer pel immediately above said nearest integer pel and a fourth adjacent integer pel immediately below said nearest integer pel,
        calculating said measure of similarity of said nearest integer pel and each of said four adjacent integer pels, calculating coefficients of a quadratic model of said similarity measure versus pel location using said calculated measure of similarity of said nearest integer pel and said four adjacent integer pels, wherein said quadratic model of said similarity measure versus pel location is:

$$S(p)=C_1 x^2+C_2 x+C_3 y^2+C_4 y+C_5$$

where: x and y are spatial coordinate of said pel location; and S(p) is the measure of similarity; and $C_1$, $C_2$, $C_3$, $C_4$ and $C_5$ are respective coefficients of the quadratic model of said similarity measure; and said step of calculating coefficients of a quadratic model of said similarity measure versus pel location includes:

$$C_1 = S(p_1) - 2S(p_2) - \frac{S(p_3)}{2}$$
$$C_2 = \frac{S(p_3) - S(p_1)}{2}$$
$$C_3 = S(p_4) - 2S(p_2) - \frac{S(p_5)}{2}$$
$$C_4 = \frac{S(p_5) - S(p_4)}{2}$$
$$C_5 = S(p_2)$$

where: $S(p_1)$ is said similarity measure of said first adjacent integer pel; $S(p_2)$ is said similarity measure of said nearest integer pel; $S(p_3)$ is said similarity measure of said second adjacent integer pel; $S(p_4)$ is said similarity measure of said third adjacent integer pel; and $S(p_5)$ is said similarity measure of said fourth adjacent integer pel, and estimating said measure of similarity for said motion vector including a fractional pel using said calculated coefficients of said quadratic model.

2. The method of video encoding of claim 1, wherein:
said measure of similarity is a Sum of Absolute Differences (SAD) calculated:

$$S(p)=\Sigma|Y(p)-Y(c)|$$

where: p is a pel in a previously reconstructed picture; c is a pel in a current picture; and Y(x) represents a luma value of a relevant pixel.

3. The method of video encoding of claim 1, wherein:
said measure of similarity is a Sum of Square of Errors (SSE) calculated:

$$S(p)=\Sigma(Y(p)-Y(c))^2$$

where: p is a pel in a previously reconstructed picture; c is a pel in a current picture; and Y(x) represents a luma value of a relevant pixel.

4. The method of video encoding of claim 1, further comprising:
calculating a rate distortion cost of said macroblock for a plurality of encoding modes using said estimated measure of similarity;
comparing said calculated rate distortion cost of said macroblock in said plurality of encoding modes;
selecting an encoding mode having a best calculated rate distortion cost; and
encoding said macroblock in said selected mode.

5. The method of video encoding of claim 1, wherein:
said current macroblock is part of a bi-directional predictive frame (B frame) having forward and backward motion vectors;
said step of determining a nearest integer pel of said fractional pel includes averaging the fractional pels of said forward and backward motion vectors; and
said step of estimating said measure of similarity for said motion vector includes said average a fractional pels.

* * * * *